(12) United States Patent
Dick

(10) Patent No.: US 6,739,440 B1
(45) Date of Patent: May 25, 2004

(54) BI-DIRECTIONAL ONE-WAY CLUTCH

(75) Inventor: Wesley Dick, Fort Wayne, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 10/456,712

(22) Filed: Jun. 6, 2003

(51) Int. Cl.$^7$ ............................................... F16D 41/16
(52) U.S. Cl. ........................... 192/39; 192/43.1; 192/46
(58) Field of Search .............................. 192/39, 37, 35, 192/28, 43.1, 43, 43.2, 46, 71, 89.21

(56) References Cited

U.S. PATENT DOCUMENTS

| | | |
|---|---|---|
| 1,236,222 A | 8/1917 | Spain et al. |
| 1,320,773 A | 11/1919 | Luxmore |
| 1,508,512 A | 9/1924 | Farley |
| 1,845,667 A | 2/1932 | Johnson |
| 2,201,492 A | 5/1940 | Jagler |
| 2,627,330 A | 2/1953 | Gantz |
| 2,664,766 A | 1/1954 | Schmal |
| 2,720,296 A | 10/1955 | Briglia |
| 2,773,574 A | 11/1956 | Able |
| 2,959,237 A | 11/1960 | Hill |
| 3,165,183 A | 1/1965 | Clements |
| 3,194,369 A | 7/1965 | White |
| 3,200,919 A | 8/1965 | Lanigan et al. |
| 3,651,907 A | 3/1972 | Myer, Sr. |
| 3,941,199 A | 3/1976 | Williams |
| 3,993,152 A | 11/1976 | Fogelberg |
| 4,069,902 A | 1/1978 | Zdeb |
| 4,098,379 A | 7/1978 | Fogelberg et al. |
| 4,124,085 A | 11/1978 | Fogelberg |
| 4,213,514 A | 7/1980 | Ehrlinger et al. |
| 4,222,473 A | 9/1980 | Kopich |
| 4,282,949 A | 8/1981 | Kopich et al. |
| 4,433,766 A | 2/1984 | Teraoka |
| 4,434,878 A | 3/1984 | Okubo |
| 4,595,087 A | 6/1986 | Morisawa et al. |
| 4,627,512 A | 12/1986 | Clohessy |
| 4,667,767 A | 5/1987 | Shea et al. |
| 4,714,129 A | 12/1987 | Mueller |
| 4,756,395 A | 7/1988 | Zlotek |
| 4,782,720 A | 11/1988 | Teraoka et al. |

(List continued on next page.)

Primary Examiner—Rodney H. Bonck
(74) Attorney, Agent, or Firm—Hahn Loeser & Parks, LLP; W. Edward Crooks, Esq.

(57) ABSTRACT

A radial, bi-directional overrunning clutch is provided that supplies on-demand power to, for example, the front wheels of a vehicle, while allowing the front wheels to overspeed the rear wheels. The clutch comprises a driving member having a plurality of radially-outwardly-biased pawls, a reversing ring, a driven member having a plurality of notches, and a housing having a plurality of pawls. The pawls on the driving member engage outwardly concentric notches on the driven member, and are activated and deactivated by inner reversing cams of the reversing ring. The pawls in the housing engage notches in the outer surface of the reversing ring, which causes the reversing ring to move between a first position and second position relative to the driving member. The engagement of the housing pawls with the reversing ring notches is regulated by the driving member.

13 Claims, 6 Drawing Sheets

U.S. PATENT DOCUMENTS

| | | |
|---|---|---|
| 4,787,491 A | 11/1988 | Kato |
| 4,817,752 A | 4/1989 | Lobo et al. |
| 4,960,192 A | 10/1990 | Kurihara |
| 4,977,989 A | 12/1990 | Ashikawa et al. |
| 5,036,939 A | 8/1991 | Johnson et al. |
| 5,038,884 A | 8/1991 | Hamada et al. |
| 5,070,978 A | 12/1991 | Pires |
| 5,085,304 A | 2/1992 | Barroso |
| 5,123,513 A | 6/1992 | Petrak |
| 5,141,088 A | 8/1992 | Kurihara et al. |
| 5,148,901 A | 9/1992 | Kurihara et al. |
| 5,170,870 A * | 12/1992 | Kampf ........................ 192/28 |
| 5,219,054 A | 6/1993 | Teraoka |
| 5,353,890 A | 10/1994 | Clohessy |
| 5,429,218 A | 7/1995 | Itoh et al. |
| 5,449,057 A | 9/1995 | Frank |
| 5,480,013 A | 1/1996 | Fujiwara et al. |
| 5,503,602 A | 4/1996 | Dick |
| 5,597,057 A | 1/1997 | Ruth et al. |
| 5,605,211 A | 2/1997 | Hall, III |
| 5,678,668 A | 10/1997 | Sink |
| 5,738,604 A | 4/1998 | Dick |
| 5,740,895 A | 4/1998 | Bigley |
| 5,927,455 A | 7/1999 | Baker et al. |
| 5,937,980 A | 8/1999 | Dick |
| 5,967,277 A | 10/1999 | Walter |
| 5,971,123 A | 10/1999 | Ochab et al. |
| 5,992,592 A * | 11/1999 | Showalter .................. 192/43.1 |
| 5,996,758 A | 12/1999 | Baxter, Jr. |
| 6,000,512 A | 12/1999 | Cronin et al. |
| 6,059,084 A | 5/2000 | Still |
| 6,176,359 B1 | 1/2001 | Krisher |
| 6,244,965 B1 * | 6/2001 | Klecker et al. ............ 192/43.1 |
| 6,336,537 B1 | 1/2002 | Krisher et al. |
| 6,409,000 B1 * | 6/2002 | Itoh et al. ..................... 192/39 |

\* cited by examiner

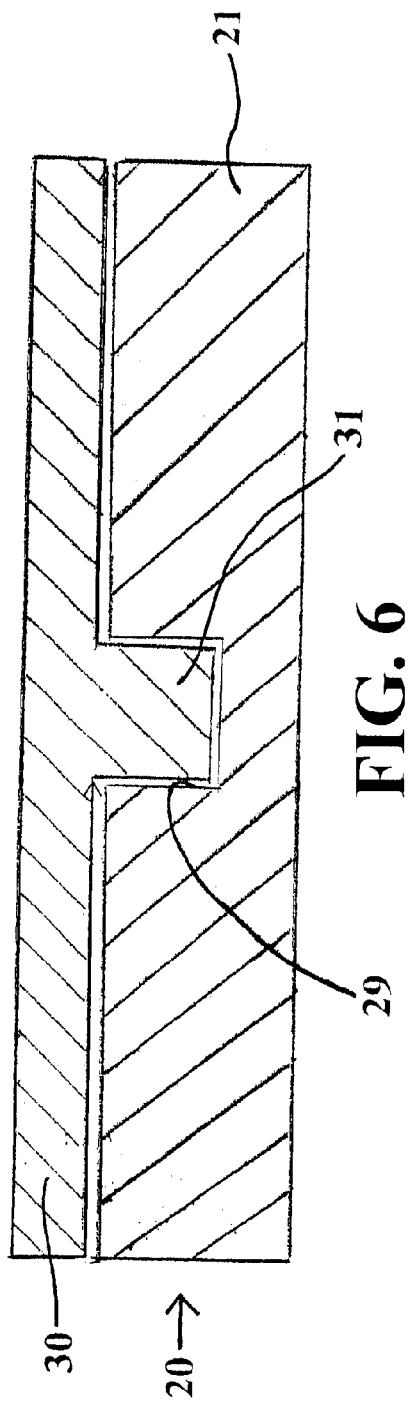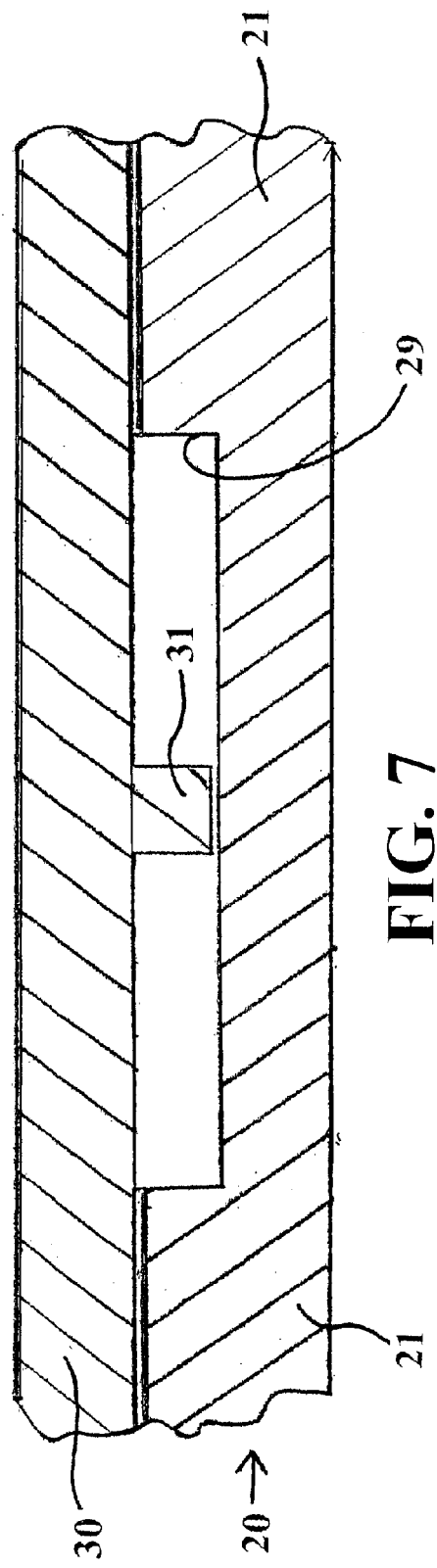

BI-DIRECTIONAL ONE-WAY CLUTCH

TECHNICAL FIELD

The present invention relates generally to clutches, and more specifically to radial clutches. Most specifically, the present invention relates to radial, bi-directional, one-way clutches used in on-demand four-wheel-drive vehicles.

BACKGROUND OF THE INVENTION

On-demand four wheel drive systems are known in the art. Examples of on-demand four wheel drive systems include electronically-controlled systems and mechanically-controlled systems. Electronically-controlled systems have a disadvantage in that they are expensive to manufacture and repair. Mechanically-controlled systems have historically been complicated and complex. Accordingly, there is a need for a simple and inexpensive bi-directional, one-way clutch that is mechanically-controlled. Accordingly, the present invention is hereby presented.

Four-wheel drive motor vehicles are becoming increasingly popular. Recently, certain motor vehicles have been provided with "full-time" four-wheel drive systems also known as all-wheel drive systems. In such all-wheel drive systems, the torque transfer cases are typically provided with an interaxle differential for dividing torque between the front and rear wheels of the motor vehicle. The interaxle differential enables the front wheels and the rear wheels to rotate at different speeds, during normal turning of the motor vehicle or in the event that the front wheels and the rear wheels have tires with different diameters. However, to prevent excessive relative slipping between the front wheels and the rear wheels, as might occur when one set of wheels encounters a low-traction condition, such as ice, these transfer cases typically include a selectively engageable clutch which is operative to lock the interaxle differential upon sensing a predetermined amount of relative slippage between the front output shaft and the rear output shaft of the transfer case. Locking of the interaxle differential prevents any further relative overrun or differentiation between the front output shaft and the rear output shaft of the transfer case.

Known prior all-wheel drive systems have generally required complex electronic sensors or other complex systems to monitor the overrun or differentiation between the transfer case front and rear output shafts or the front wheels and the rear wheels of a motor vehicle. Upon sensing relative overrun or differentiation, an electronic control system determines whether the relative overrun or differentiation being encountered is within a "normal" expected range or is "excessive." If the electronic control system indicates that the overrun or differentiation is "excessive," the electronic control system causes the clutch to lock the interaxle differential to preclude any further relative overrun or differentiation. An electronic control system of this type can be expensive to manufacture and maintain and a more cost-effective, simplified "on demand" system of limiting more than a predetermined amount of overrun or differentiation between the front wheels and the rear wheels of the motor vehicle would be desirable.

In recent years, motor vehicle all-wheel drive power-train systems have been cost-reduced by eliminating the transfer case differential, providing continuous power to a primary axle, and providing on-demand power to the secondary axle whenever primary axle slippage occurs. Typically, a torque-coupling device (viscous, hydraulic, electric) is utilized within the transfer case to drive the secondary axle. The torque-coupling device compensates for any speed difference which may occur between the primary and secondary axles. When the secondary axle is a front axle, an open differential is typically installed. Torque-sensing differentials with clutch pack pre-load are not considered acceptable for front axles due to steering issues attributable to torque bias. The front wheels tend to slide rather than turn on low coefficient-of-friction surfaces.

SUMMARY OF THE INVENTION

The present invention comprises a radial-type clutch that supplies on-demand power to, for example, the front wheels of a vehicle, while allowing the front wheels to overspeed the rear wheels. The clutch comprises a driving member having a plurality of radially-outwardly-biased pawls, a reversing ring, a driven member having a plurality of notches, and a housing having a plurality of pawls. The pawls on the driving member engage outwardly concentric notches on the driven member, and are activated and deactivated by inner reversing cams of the reversing ring. The pawls in the housing engage notches in the outer surface of the reversing ring, which causes the reversing ring to move between a first position and second position relative to the driving member. The engagement of the housing pawls with the reversing ring notches is regulated by the driving member.

SUMMARY OF THE DRAWINGS

FIG. 6 is a cross-section through 6—6 of FIG. 4, shown without the reversing ring being broken away.

FIG. 7 is a schematic representation of a cross-section through the line 7—7 of FIG. 4, shown without the reversing ring being broken away.

DETAILED DESCRIPTION OF A PREFERRED EMBODIMENT OF THE INVENTION

Figure 1:
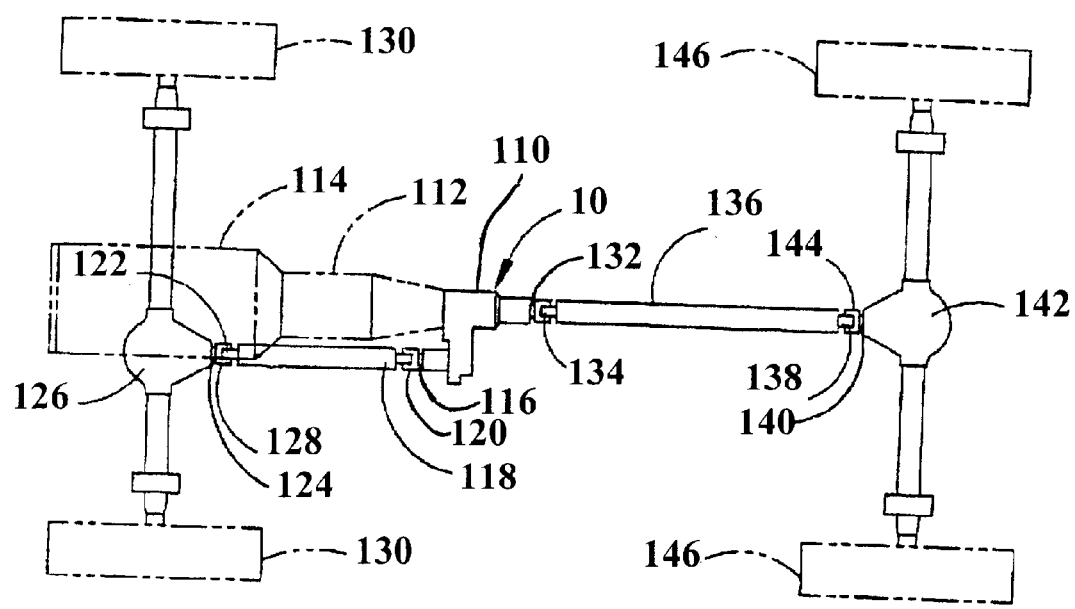
FIG. 1 is a schematic view of a vehicle powertrain.

Referring now to the drawings, in which like-referenced characters indicate corresponding elements throughout the several views, attention is first directed to FIG. 1, which illustrates a top plan schematic view of a motor vehicle having a four-wheel drive system with a torque transfer case with limited differentiation in accordance with preferred embodiments of the present invention. Torque transfer case 110 may house the radial, bi-directional overrunning clutch 10 of the present invention. Torque transfer case 110 is coupled with motor vehicle transmission 112 of conventional design which, in turn, is coupled to motor vehicle drive engine 114. Torque transfer case 110 generally includes a first or front torque output shaft 116, which is connected to the rearward end of motor vehicle front axle drive shaft 118 via universal joint coupling 120 of conventional design.

Forward end 122 of motor vehicle front axle drive shaft 118 is coupled to input shaft or yoke 124 of motor vehicle front differential unit 126 via universal joint coupling 128 of conventional design. Motor vehicle front differential unit 126 is adapted to divide torque from, motor vehicle front axle drive shaft 118 to front wheels 130 of the motor vehicle. Torque transfer case 110 also includes second or rear torque output shaft 132 which is drivingly connected to forward end 134 of motor vehicle rear axle drive shaft 136 of conventional design. Motor vehicle rear axle drive shaft 136 has rearward end 138 connected to input shaft or yoke 140 of motor vehicle rear differential unit 142 via universal joint coupling 144 of conventional design. Motor vehicle rear differential unit 142 is adapted to divide torque received from motor vehicle rear axle drive shaft 136 between rear wheels 146 of the motor vehicle.

Figure 2:
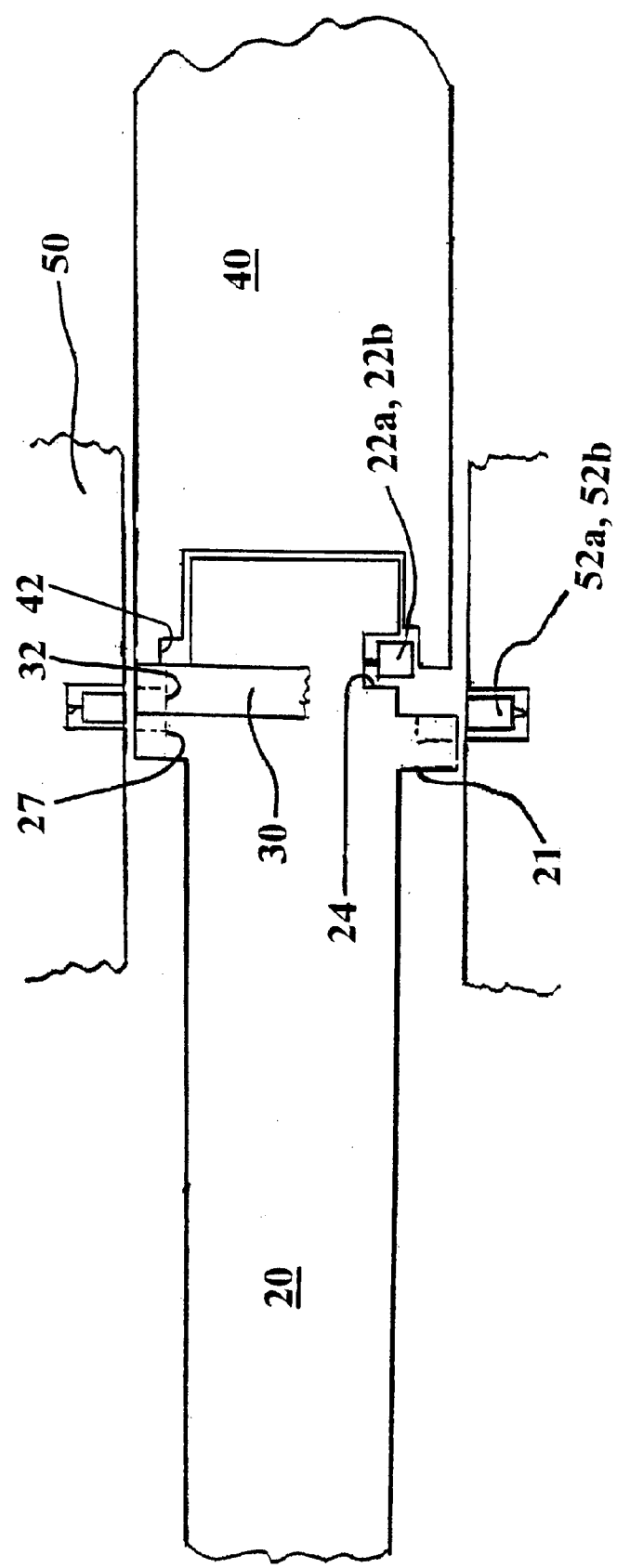
FIG. 2 is a side view of a schematic representation of a bi-directional, one-way-clutch, in accordance with a preferred embodiment of the present invention.

A side view of a preferred embodiment of a radial, bi-directional, overrunning clutch 10 is illustrated in FIG. 2. A preferred embodiment of the clutch 10 comprises a driving member 20, a reversing ring 30, a driven member 40, and a housing 50. The driving member 20 is operably connected to the rear wheels of a four-wheel-drive vehicle. As such, the driving member 20 rotates in either a clockwise or counterclockwise rotation (as viewed from FIGS. 3–5), depending on whether the vehicle is moving forward or backward. The driven member 40 is operably connected to the front wheels. It should be understood that the driving member 20 may be operably connected to the rear wheels, and driven member 40 may be connected to the front wheels. Driving member 20 nonetheless receives power from the set of wheels that mainly power the vehicle.

Figure 3:
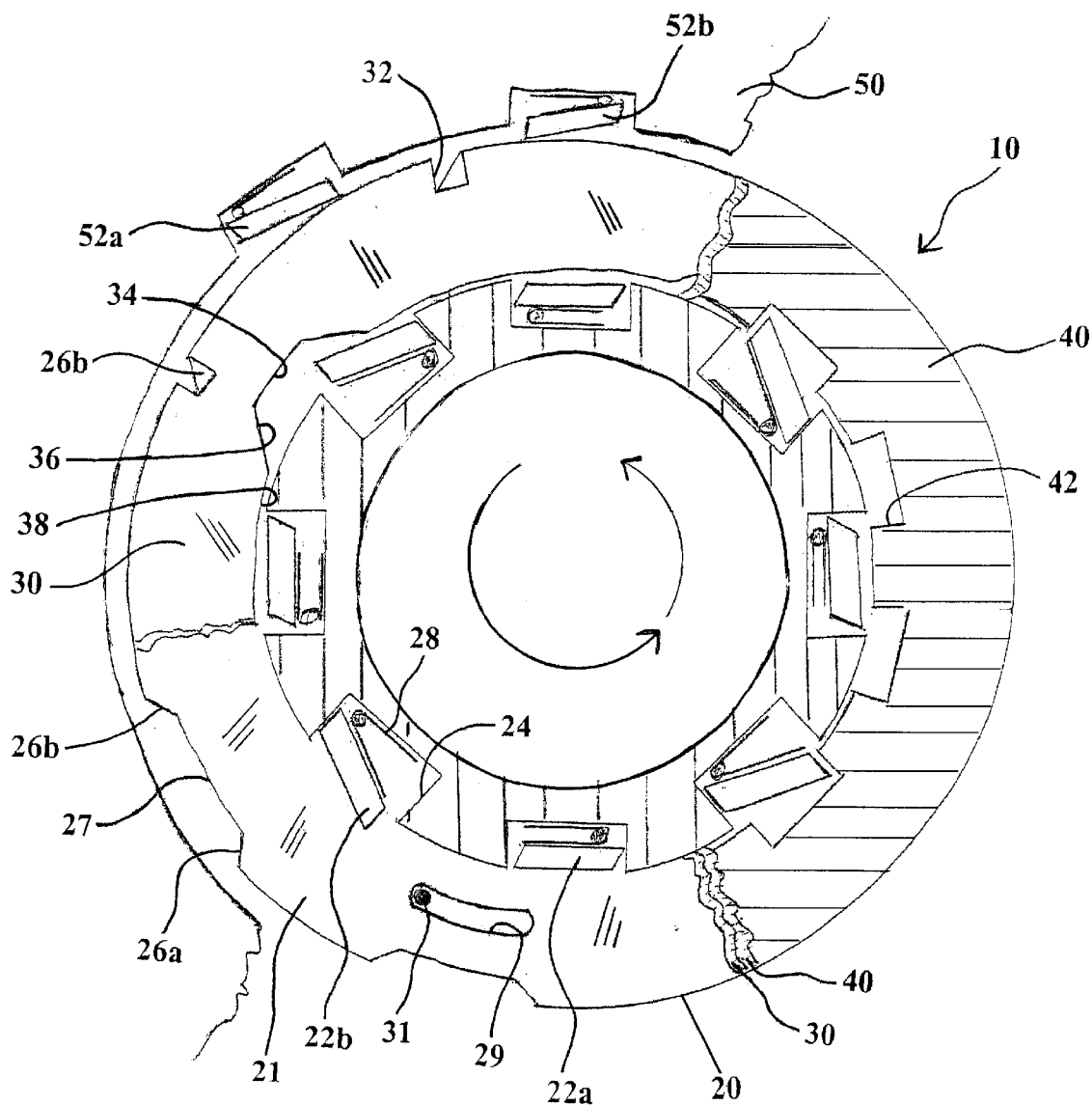
FIG. 3 is a front view of a bi-directional, one-way clutch as configured with the driving member rotating counterclockwise, in accordance with a preferred embodiment of the present invention, certain components being partially broken away to better illustrate the present invention.

The driving member 20 has two opposing sets of pawls 22a and 22b that are biased radially outward from the driving member 20. The number of pawls 22a and 22b can vary without deviating from the scope of the present invention. Each pawl 22a or 22b sits in a pocket 24 in the driving member when the pawl 22a or 22b is not extended. The inward surfaces of the pawls 22a and 22b are each attached to a spring 28, as illustrated in FIG. 3, which is secured to the pawl pocket 24. The spring 28 tends rotate or extend pawls 22a and 22b, which urges one end radially outward. The pawls 22a and 22b are preferably rectangular in shape. However, it is contemplated that pawls 22a and 22b can have any shape known in the art. Additionally, the pawls 22a and 22b can have any of a plurality of spring mechanisms known in the art.

The sets of pawls 22a and 22b are selectively engagable with notches 42 in the driven member 40. One set of pawls 22a are arranged to engage notches 42 in the driven member 40 upon clockwise rotation of the driving member 20 (from the perspective of FIG. 3). The opposing set of pawls 22b are arranged to engage notches 42 in the driven member 40 upon counterclockwise rotation of the driving member 40.

The sets of pawls 22a and 22b are selectively activated and deactivated by camming action of the reversing ring 30. The reversing ring 30 is generally located between the driving member 20 and the driven member 40. Preferably, the reversing ring 30 is adjacent to a lip or shoulder 21 of the driving member, as seen in FIG. 2. The reversing ring 30 has a plurality of spaced-apart indentations 34 and reversing cams 36 on its inwardly-facing surface 38, which interact with pawls 22a and 22b on the driving member 20. The indentations 34 and reversing cams 36 are arranged such that only one set of pawls 22a or 22b can engage notches 42 at any one moment of time. For example, as seen in FIG. 3, the indentations 34 of the reversing ring are positioned such that pawls 22b are engagable with notches 42 in the driven member 40. It should be understood that any number of pawls of one set 22a or 22b can actually engage notches 42 in the driven member, i.e., only one pawl of the particular set 22a or 22b needs to engage a notch 42 to transmit power to the driven member 40. To simplify illustration and understanding of the clutch 10, every pawl of the set 22b is illustrated as engaging a notch 42 in FIG. 3.

The reversing ring 30 is rotatable a limited number of degrees relative to the driving member 20, which activates one set 22a or 22b of pawls and deactivates the other set. As illustrated in FIGS. 6–7, a preferred method of limiting the rotation of the reversing ring relative to the driving member comprises at least one projection 31, projecting axially from the reversing ring 30 that is received within groove 29 on the driving member. Further embodiments for limiting the rotation of the reversing ring 30 relative to the driving member 20 are contemplated, and can be utilized without deviating from the scope of the present invention.

As illustrated in FIG. 3, the indentations 34 and reversing cams 36 in the reversing ring are positioned over pawl set 22b during counterclockwise rotation of the driving member 20. Therefore, pawls 22b are ready to engage notches 42 in the driven member if the driving member 20 overspeeds the driven member 40 in a counterclockwise direction. If the driven member 40 overspeeds the driving member 20 in the counterclockwise direction, pawls 22b will ratchet out of the way. Therefore, the clutch 10 allows the front wheels to turn faster than the rear wheels, but does not allow the rear wheels to rotate faster than the front wheels.

Figure 4:
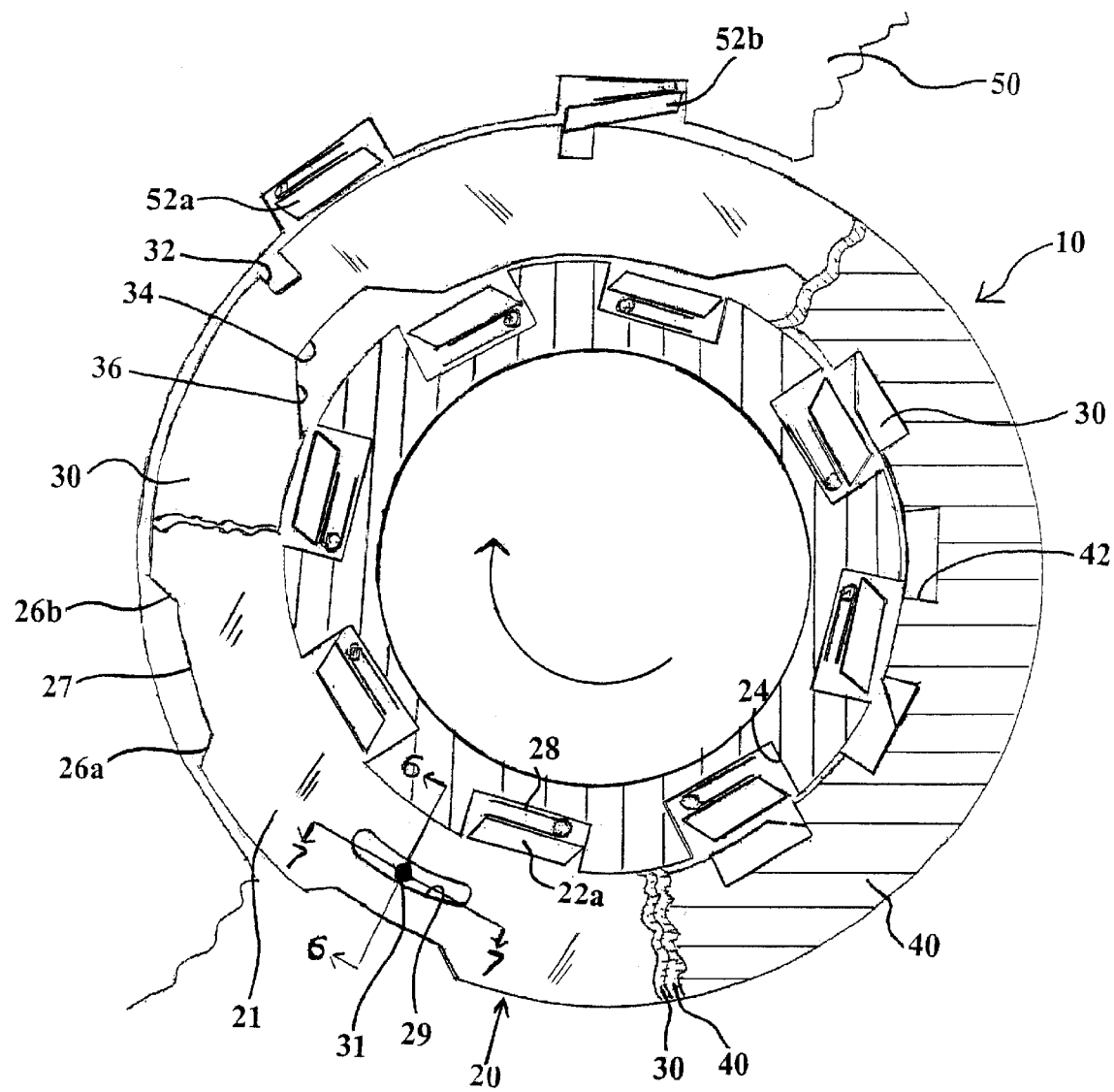
FIG. 4 is a front view of a bi-directional, one-way clutch in transition as the driving member begins rotating clockwise and a housing pawl engages a notch in the reversing ring, which allows the reversing ring to translate relative to the driving member, certain components being partially broken away to better illustrate the present invention.
Figure 5:
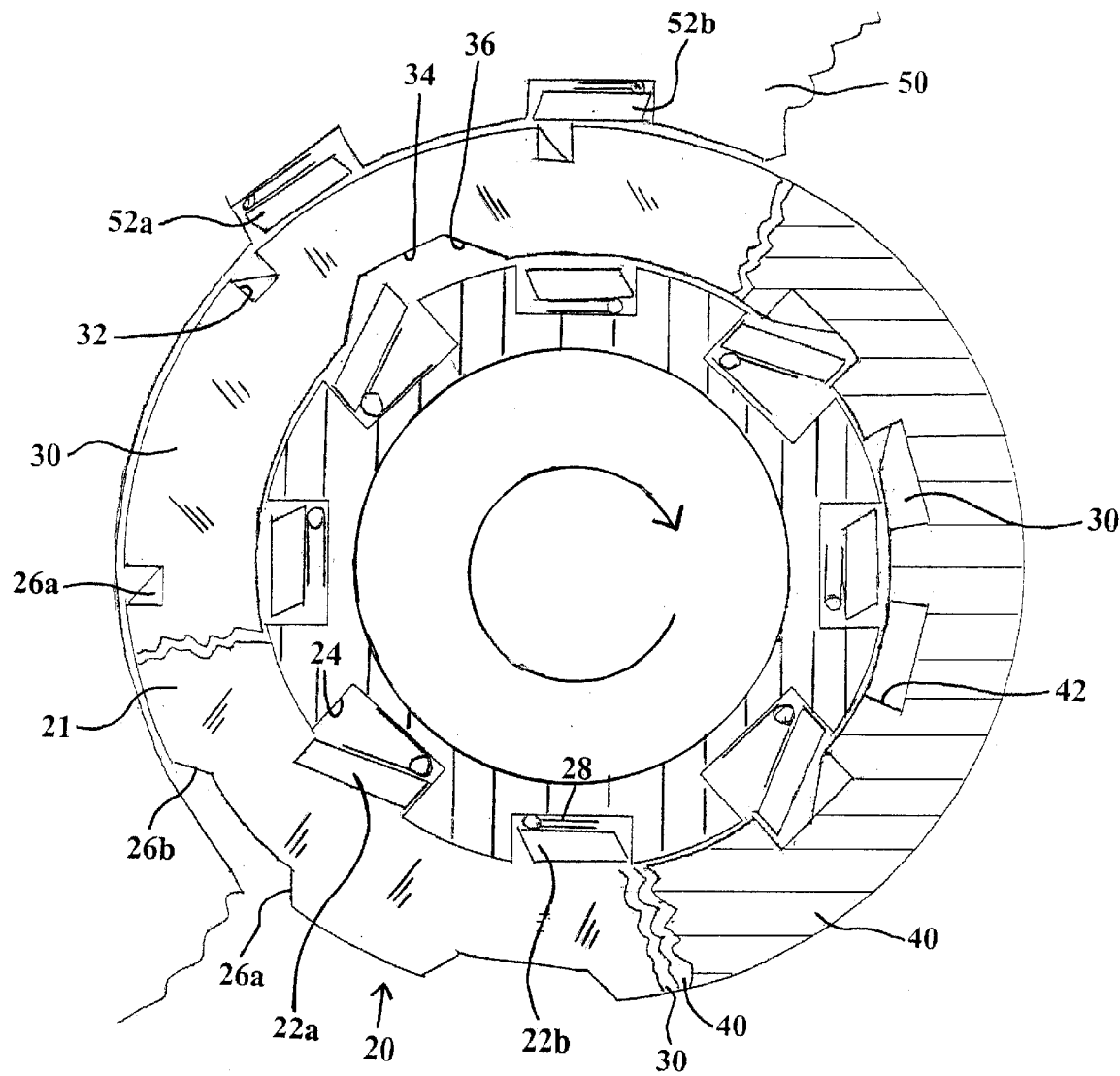
FIG. 5 is a front view of a bi-directional, one-way clutch after the transition phase, when the housing pawl is cammed out of contact with the reversing ring, and driving member and reversing ring are rotating clockwise in unison, certain components being partially broken away to better illustrate the present invention.

As illustrated in FIGS. 3–5, the outer edge of the driving member 20 has a plurality of camming surfaces 26a, 26b and indentations 27. The camming surfaces 26a, 26b and indentations 27 are located radially inward of the housing pawls, 52a and 52b, and facilitate engagement and disengagement between the housing pawls 52a and 52b and notches 32 in the outer edge of the reversing ring 30, as further explained subsequently. For example, when configured for counterclockwise rotation, as illustrated in FIG. 3, both the driving member 20 and reversing ring 30 are rotating counterclockwise in unison. Neither set of housing pawls 52a and 52b will engage notches 32 on the reversing ring 30. As can be seen in FIG. 2, the housing pawls 52a and 52b interact with both the outer edge of the driving member 20 and the outer edge of the reversing ring 30. Thus, the housing pawls 52a and 52b can only engage a notch 32 in the reversing ring 30 if the particular notch 32 coincides with an indentation 27 in the outer edge of the driving member 20. As the driving member 20 and reversing ring 30 are rotating counterclockwise, housing pawl 52b will ratchet out of the way of notches 32. Housing pawl 52a will contact camming surface 26b on the driving member 20 and will also ratchet out of the way of notches 32.

FIG. 4 illustrates a transition when the rear wheels begin turning in the opposite direction. When the driving member 20 changes from counterclockwise rotation to clockwise rotation, i.e., the vehicle rear wheels begin moving in the opposite direction, at least one pawl 52b in the housing contacts an outward notch 32 in the reversing ring 30. The engagement of the pawl 52b with the reversing ring 30 causes the reversing ring 30 stop rotating in relation to the housing 50, which therefore causes the reversing ring 30 to rotate relative to the driving member 20. After the reversing ring 30 rotates a predetermined number of degrees relative to the driving member 20, camming surfaces 26a on the driving member 20 urge pawl 52b to retract and disengage from the outward notch 32 in the reversing ring 30. Thereinafter, the reversing ring 30 and driving member 20 rotate together.

The rotation of the reversing ring 30 relative to the driving member 20 is limited by a rotation limiter. Preferably, the reversing ring 30 and the driving member 20 each have engaging elements 29, 31 that interact with one another to limit the rotation of the reversing ring 30 relative to the driving member 20. For example, the engaging elements 29, 31 may comprise a closed-ended groove that receives a projection. It is contemplated that the groove can be formed into either the reversing ring 30 or the driving member 20. Whichever of either the reversing ring 30 or driving member 20 that does not have a groove would have a projection.

As can be seen in FIGS. 6–7, a preferred embodiment of the rotation limiter comprises a projection 31 in the reversing ring that is received within a groove 29 in the driving member 20. FIGS. 6–7 illustrate groove 29 in the shoulder 21 of the driving member 20; however, it is contemplated that the projection and groove could be radially-extending, such as a groove spaced longitudinally rearward of the driving member pawls 22a and 22b.

The reversing ring 30 can move from a first position to a second position in relation to the driving member 20. In the first position, as seen in FIG. 3, the projection 31 is located at one end of the groove 29. In the second position, as seen in FIG. 5, the projection 31 is located at the opposite end of the groove 29. In relation to the inner edge and outer edge of the reversing ring 30, the length of the groove 29 is selected to allow indentations 34 and reversing cams 36 to juxtapose from one set of pawls 22a or 22b to the opposite set of pawls 22a or 22b, and to simultaneously allow the notches 32 to juxtapose from one camming surface 26a or 26b to the opposite camming surface 26a or 26b, when the reversing ring moves from the first position to the second position.

By translating the reversing ring 30 from a first position to a second position relative to the driving member 20, indentations 34 that were over pawls 22b are now juxtaposed over the opposite set 22a of pawls, enabling pawls 22a to extend and engage with notches 42 in the driven member 40 if the driving member 20 overspeeds the driven member 40. In a similar manner as was seen in counter-clockwise rotation, driven member 40 can now overspeed the driving member 20 in the clockwise direction, but the driving member 20 cannot overspeed the driven member 40.

As can be understood by the foregoing description, housing pawls 52a and 52b engage with outward notches 32 in the reversing ring. The housing pawls 52a and 52b are engaged and disengaged by the interaction between the driving member 20 and the reversing ring 30. In a similar manner, driving member pawls 22a and 22b engage with notches 42 in the driven member 40. The driving member pawls 22a and 22b are activated and deactivated by the interior surfaces 34, 36 and 38 of the reversing ring.

The forgoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention and are not to be construed as limited to the specific embodiments disclosed.

What is claimed is:

1. A radial bi-directional overrunning clutch assembly, comprising:

a driving member with first and second sets of radially-outwardly-biased pawls, the sets of driving member pawls each having at least one pawl, the driving member being rotatable in a first direction and a second direction;

a reversing ring radially outward of the driving member pawls;

a driven member having notches that are radially outward of the driving member pawls, the notches being selectively engagable with the driving member pawls; and a housing at least partially containing the driving member, reversing ring, and driven member, wherein the reversing ring is rotatable a limited number of degrees relative to the driving member between a first position and a second position, means, at least partially carried by the housing, for actuating the rotation of the reversing ring relative to the driving member, when the reversing ring is in the first position, the first set of driving member pawls is activated and the second set of driving member pawls is deactivated, at least one pawl of the first set of driving member pawls engaging one of the notches in the driven member when the driving member overspeeds the driven member in the first direction of rotation, and when the reversing ring is in the second position, the second set of driving member pawls is activated and the first set of driving member pawls is deactivated, at least one pawl of the second set of driving member pawls engaging one of the notches in the driven member when the driving member overspeeds the driven member in the second direction of rotation.

2. The radial bi-directional overrunning clutch assembly of claim 1, further comprising a rotation limiter limiting the rotation of the reversing ring relative to the driving member.

3. The radial bi-directional overrunning clutch assembly of claim 2, wherein the rotation limiter comprises at least one closed-ended groove that receives a projection.

4. The radial bi-directional overrunning clutch assembly of claim 1, wherein the rotation limiter comprises at least one groove in the driving member that receives a projection from the reversing ring.

5. The radial bi-directional overrunning clutch assembly as recited in claim 1, wherein, the means, at least partially carried by the housing, for actuating the rotation of the reversing ring relative to the driving member comprises opposing sets of radially-inwardly-biased pawls operably attached to the housing, each set of housing pawls having at least one pawl, the housing pawls being radially outward of an outer edge of the reversing ring and an outer edge of the driving member.

6. The radial bi-directional overrunning clutch assembly as recited in claim 5, wherein the outer edge of the reversing ring further comprises a plurality of notches, the reversing ring notches being selectively engagable with the housing pawls to rotate the reversing ring relative to the driving member between the first position and the second position.

7. The radial bi-directional overrunning clutch assembly as recited in claim 6, wherein the outer edge of the driving member that is radially inward of the housing pawls further comprises a plurality of indentations and camming surfaces, the plurality of indentations and camming surfaces being adapted to selectively engage and disengage the housing pawls from the reversing ring notches.

8. A radial bi-directional overrunning clutch assembly, comprising:
- a longitudinally extending driving member, the driving member having a front end, a rear end, and a radially-extending shoulder having a radially outward edge, the driving member being rotatable about an axis and comprising:
  - a plurality of indentations and camming surfaces on the radially outward edge of the shoulder; and,
  - opposing sets of radially-outwardly-biased pawls spaced forwardly and radially inwardly of the shoulder, each set of driving member pawls having at least one pawl;
- a reversing ring forwardly adjacent to the shoulder, the reversing ring having a plurality of indentations and reversing cams on an inner edge and a plurality of notches in an outer edge; and,
- a housing, the housing having opposing sets of pawls that are selectively engagable with the notches in the outer edge of the reversing ring, each set of housing pawls having at least one pawl; and
- a driven member coaxial with the driving member, the driven member having a front end and a rear end, the rear end of the driven member being outwardly concentric to the front end of the driving member, the driven member having a plurality of notches that are outwardly concentric to the driving member pawls,
- wherein the reversing ring is rotatable relative to the driving member between a first position and a second position,
- when the reversing ring is in the first position, the reversing ring indentations are aligned with the first set of driving member pawls, and
- when the reversing ring is in the second position, the reversing ring indentations are aligned with the second set of driving member pawls.

9. A bi-directional overrunning clutch, comprising:
- a housing, the housing having opposing sets of radially-inwardly-biased pawls;
- a driving member shaft having a rearward end, a forward end, a radially-extending shoulder spaced from the forward end, and opposing sets of radially-outwardly-biased pawls spaced forwardly of the shoulder, each set comprising at least one pawl;
- a reversing ring forwardly adjacent to the shoulder, the reversing ring having a plurality of indentations and reversing cams on an inner edge and a plurality of notches on an outer edge; and,
- a driven member shaft coaxial with the driving member shaft, the driven member shaft having a rearward end and a forward end, the rearward end being forwardly adjacent to the reversing ring and having a plurality of notches selectively engageable with the driving member pawls.

10. The bi-directional overrunning clutch as recited in claim 9, wherein an outer edge of the driving member shoulder and an outer edge of the reversing ring are radially inward of the housing pawls.

11. The bi-directional overrunning clutch as recited in claim 9, wherein the inner edge of the reversing ring and the driven member notches are radially outward of the driving member pawls.

12. The bi-directional overrunning clutch as recited in claim 9, wherein the reversing ring is rotatable a limited number of degrees relative to the driving member between a first position and a second position,
- when the reversing ring is in the first position, the reversing ring indentations are aligned with the first set of driving member pawls, and
- when the reversing ring is in the second position, the reversing ring indentations are aligned with the second set of driving member pawls.

13. The bi-directional overrunning clutch as recited in claim 12, wherein the reversing ring rotates between the first position and the second position when the driving member changes its direction of rotation.

* * * * *